2,962,387

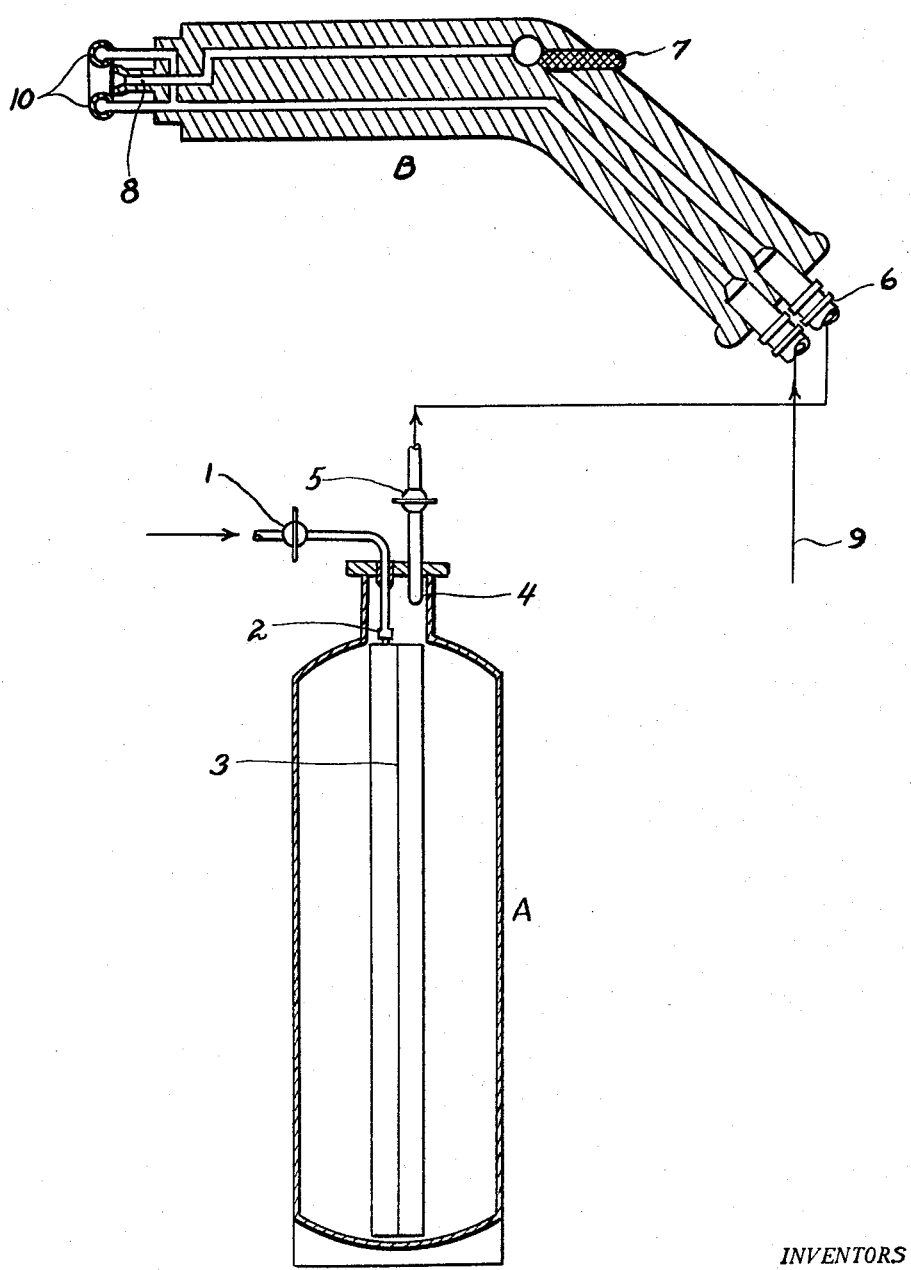

COATINGS OF CHLORINATED POLYETHYLENE ON SUBSTRATES OF METALS, TEXTILES OR PAPER

Heinz Noeske, Oberhausen-Sterkrade, Friedrich Gross, Oberhausen-Holten, and Wilhelm Borns, Oberhausen-Sterkrade-Nord, Germany, assignors to Ruhrchemie Aktiengesellschaft, Oberhausen-Holten, Germany Filed Aug. 27, 1958, Ser. No. 757,456

Claims priority, application Germany Sept. 19, 1957

6 Claims. (Cl. 117—47)

In the flame spraying process, a pulverulent plastic material is softened as it passes through a flame and is immediately sprayed onto a hot metal substrate at about 200° C. As is known, polyethylene coatings can be applied to metals or other materials in this manner. These coatings have the deficiency of poor adhesion to the substrate. Moreover, polyethylene coatings applied by flame spraying tend to shrink badly upon cooling, the shrinkage being in the order of magnitude up to about 10 percent. This susceptibility to shrinkage causes severe internal stresses of the coatings so that the protective layers will detach from substrate even in case of minor strains, either by bending of the coated articles or by the action of chemical reagents.

It has been found that coatings of chlorinated polyethylene having preferred chlorine contents of 8–17% and applied to substrates of metals, textiles, paper, glass, wood, etc. do not possess these disadvantages. The coating of chlorinated polyethylene generally adheres perfectly to metals and even to bare aluminum plates. Although the metal surface will be previously roughened in many cases, e.g. by sandblasting, the coatings according to the invention adhere even to non-pretreated substrates so that the roughening may be omitted in most cases.

Practically no shrinkage has been observed in case of the new coatings of chlorinated polyethylene. It is possible, in fact, to provide metal plates and other substrates with coatings of chlorinated polyethylene adhering so perfectly to the substrates that the plates treated in this manner can safely be flexed at angles in excess of 90° around a mandrel of 12 mm. diameter without cracking or formation of pores at the point of flexure.

It was unexpected that the chlorinated polyethylenes would be able to withstand the temperature of 200° C. and more required for flame spraying, all the more in view of the fact that it had not been possible up to the present to obtain satisfactory polyvinyl chloride coatings by flame spraying.

The coatings are applied to substrates of metals, textiles, paper, glass, wood, etc. by spraying pulverulent chlorinated polyethylene having preferred chlorine contents of 8–17% and being in softened or fluid state onto the substrate which is heated if desired. Spray guns for plastics prove to be particularly suitable for this purpose. No marked evolution of hydrochloric acid can be observed in case of chlorine contents of 8–17%. When using polyethylenes chlorinated to a higher degree, the splitting off of HCl can be overcome by adding to the composition to be sprayed small amounts of a powder having a porous surface, e.g. carbon black. Another method of reducing the evolution of hydrochloric acid is the addition of stabilizers such as organic tin compounds. The precautions mentioned above are omitted when using a chlorinated polyethylene having a chlorine content of 8–17%.

The chlorinated polyethylenes to be used for flame spraying are in form of a powder having a preferred particle size of less than 0.2 mm. It is of particular advantage to use chlorinated polyethylenes which, in the chlorination process, are directly obtained as a powder, as is the case, for example, when effecting the chlorination by the fluid process. In this process which has already been suggested, gaseous chlorine, particularly preheated chlorine gas, is allowed to act on solid polyethylene which is as finely divided as is possible, said action taking place at temperatures not substantially in excess of 100° C. with the finely divided polyethylene being maintained in the fluidized state by means of the gas used for the chlorination. Best results are obtained with polyethylenes of the type obtained by polymerizing ethylene at pressures below 100 kg./cm.² and at temperatures up to 100° C. and with the use of catalysts consisting of mixtures of organometallic compounds, particularly aluminum alkyl compounds and/or aluminum halogen compounds with compounds of metals of the 4th to 6th subgroups of the periodic table, particularly titanium halides.

If colored coatings are desired, heat-resistant pigments may be added to the chlorinated polyethylene. Additives increasing the gloss may also be used. Particularly suitable for this purpose are chlorinated aromatics, e.g. the chlorinated diphenyl known under the trade name of "Clophen W." This material is manufactured by Farbenfabriken Bayer A.G., Leverkusen, Germany, and has a chlorine content of approximately 52 percent.

In one embodiment of the process according to the present invention, mixtures of chlorinated and non-chlorinated polyethylenes are used.

The following examples are given to illustrate the invention. However, it should be understood that these are given merely by way of explanation, not of limitation, and that numerous changes may be made in the details without departing from the spirit of the invention.

In the examples, all of the products were sprayed onto the substrate by means of a commercially available spray gun for plastics using coke oven gas for heating and using air for whirling up the powder. The amounts given in the examples are in percent by weight.

*Example 1*

Chlorinated polyethylene in powder form having a molecular weight of approximately 80,000, as determined viscosimetrically, prior to the chlorination and a chlorine content of 12% and containng no further additions was flame-sprayed onto a bare aluminum plate. This resulted in a smooth translucent coating free from pores. Evolution of hydrochloric acid was not observed.

*Example 2*

Chlorinated polyethylene in powder form having a molecular weight of 315,000, as determined viscosimetrically, prior to the chlorination and a chlorine content of 14.2% and mixed with 0.3% of a tin mercaptile (trade name "Stabilisator 17M" of German Advance Corporation) was flame-sprayed onto a bare aluminum plate. This resulted in a smooth translucent coating free from pores. Evolution of hydrochloric acid was not observed during the spraying procedure.

*Example 3*

Chlorinated polyethylene in powder form having a molecular weight of 80,000, as determined viscosimetrically, prior to the chlorination and a chlorine content of 19% was mixed with 1% of carbon black and 0.2% of a chlorinated diphenyl ("Clophen W") which was added in form of a solution in hexane to obtain best possible dispersion in the pulverulent product. The hydrocarbon was then distilled off in a heatable mixer. Spraying of this mixture onto substrates resulted in coatings with a particularly smooth surface free from pores. Evolution of hydrochloric acid was observed to a minor extent only.

Example 4

A mixture comprising (a) 90% of chlorinated polyethylene in powder form having a molecular weight of 80,000, as determined viscosimetrically, prior to the chlorination and a chlorine content of 15% and (b) 10% of a non-chlorinated polyethylene in powder form having a molecular weight of 1,200,000, as determined viscosimetrically, was mixed with 0.2% of carbon black and 0.3% of a chlorinated diphenyl (trade name, "Clophen W") in the manner described in Example 3. Flame spraying of this mixture onto a smooth aluminum plate resulted in a smooth pore-free coating adhering satisfactorily to the substrate. Evolution of hydrochloric acid was not observed during the flame spraying procedure.

Example 5

A chlorinated polyethylene having a molecular weight of 70,000, as determined viscosimetrically, prior to the chlorination and a chlorine content of 12.3% was mixed with 0.5% of a blue pigment consisting of cobalt and aluminum and with 0.2% of a chlorinated diphenyl (trade name, "Clophen W") in the manner described in Example 3. Flame spraying of the composition onto a bare aluminum plate resulted in a smooth blue-colored coating having a pore-free surface.

The accompanying drawing shows a spray gun suitable for the application of the coatings according to the instant invention.

In the drawing,

A is the storage container for the powder, and B is the spray gun itself.

Referring to the drawing, the heating gas required for operation enters the spray gun B through hose connection 9 and is burned at the ring burner 10. The powdered chlorinated polyethylene is kept in container A. Air is admitted into A under pressure through the opening provided with valve 1. The air passes along deflector plate 3 which has a cross-shaped profile. Thus, the air loaded with the powder enters pipe 4 which has a shut-off valve 5. Pipe 4 is connected to the mouthpiece 6 of gun B by a hose. The air and powder enter through 6 and pass jet 8. Air and powder thereby are blown into the flame emerging from ring burner 10. The amount of air and thus of chlorinated polyethylene entered into the flame can be regulated by actuation of valve 7.

What we claim is:

1. A process for applying coatings of chlorinated polyethylene in a fluid state onto substrates selected from the class consisting of metal, glass, textiles, paper and wood, which comprises flame-spraying chlorinated polyethylene having a chlorine content of 8–17 percent onto said substrates.

2. The process according to claim 1, wherein said substrates are heated prior to spraying.

3. The process according to claim 1, wherein unchlorinated polyethylene is admixed to said chlorinated polyethylene.

4. A process for applying coatings of chlorinated polyethylene in a fluid state onto substrates selected from the class consisting of metal, glass, textiles, paper and wood, which comprises flame-spraying onto said substrates chlorinated polyethylene having a chlorine content of 8–17 percent and containing a chlorinated diphenyl having a chlorine content of approximately 52 percent to increase the gloss.

5. A process for applying coatings of chlorinated polyethylene in a fluid state onto substrates selected from the class consisting of metal, glass, textiles, paper and wood, which comprises flame-spraying onto said substrates chlorinated polyethylene having a chlorine content of 8–17 percent and containing tin mercaptide as a stabilizer.

6. A process for applying coatings of chlorinated polyethylene in a fluid state onto substrates selected from the class consisting of metal, glass, textiles, paper and wood, which comprises flame-spraying onto said substrates chlorinated polyethylene having a chlorine content of 8–17 percent and containing pigments to impart color to said coatings.

References Cited in the file of this patent

FOREIGN PATENTS

| | | |
|---|---|---|
| 551,339 | Great Britain | Feb. 18, 1943 |
| 461,905 | Italy | Feb. 20, 1951 |
| 898,872 | Germany | Dec. 3, 1953 |
| 708,352 | Great Britain | May 5, 1954 |

OTHER REFERENCES

Schildknecht: "Vinyl and Related Polymers," 1952, John Wiley & Sons, New Chapman & Hall Limited, London, pages 527 and 528 relied on. Copy in Scientific Library and in Div. 25.